United States Patent

[11] 3,615,776

| [72] | Inventors | Grant M. Farrington<br>Marlton, N.J.;<br>Walter S. Treffner, Linthicum Heights;<br>George D. MacKenzie, Timonium, Md. |
|---|---|---|
| [21] | Appl. No. | 717,788 |
| [22] | Filed | Apr. 1, 1968 |
| [45] | Patented | Oct. 26, 1971 |
| [73] | Assignee | General Refractories Company<br>Philadelphia, Pa. |

[54] UNBURNED BASIC REFRACTORY BRICK AND METHOD OF MAKING SAME
12 Claims, 1 Drawing Fig.

| [52] | U.S. Cl. | 106/59 |
|---|---|---|
| [51] | Int. Cl. | C04b 35/42 |
| [50] | Field of Search | 106/59 |

[56] References Cited
UNITED STATES PATENTS

| 3,301,690 | 1/1967 | Rigby | 106/59 |
|---|---|---|---|
| 3,180,743 | 4/1965 | Davies et al. | 106/59 |
| 3,180,745 | 4/1965 | Davies | 106/59 |
| 3,321,322 | 5/1967 | Mikami | 106/59 |
| 3,429,723 | 2/1969 | Maier et al. | 106/59 |

FOREIGN PATENTS

| 1,073,691 | 6/1967 | Great Britain | 106/59 |
|---|---|---|---|

Primary Examiner—James E. Poer
Attorney—Howson and Howson

ABSTRACT: An unburned basic refractory brick composed of a mixture of relatively coarse magnesia particles, relatively coarse chrome-ore particles and from about 15 to about 40 percent of relatively fine aggregates consisting essentially of a prereacted mixture of periclase particles sintered directly to chrome-ore particles.

PATENTED OCT 26 1971
3,615,776
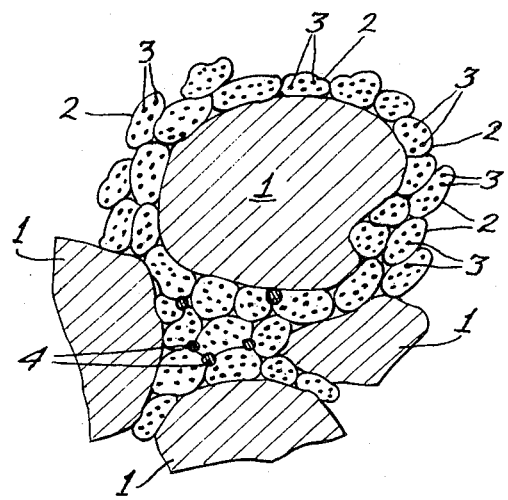
INVENTORS:
GRANT M. FARRINGTON
WALTER S. TREFFNER
GEORGE D. MAC KENZIE
BY
Howson & Howson
ATTYS.

UNBURNED BASIC REFRACTORY BRICK AND METHOD OF MAKING SAME

BACKGROUND OF THE INVENTION

Unburned, basic refractory brick are used, for example, in the construction of the walls and roof of an open hearth steelmaking furnace. Such brick have been made in the past by pressing a tempered mixture of relatively coarse magnesia particles, relatively coarse chrome-ore particles, and relatively fine magnesia particles. For tempering (adjusting to the proper consistency for pressing) and bonding, an aqueous binder, such as sulfuric acid, chromic acid, magnesium sulfate or chloride, lignin, and combinations thereof, and the like, have been used. The relative proportions of coarse magnesia, coarse chrome ore and fine magnesia are generally from about 30 to about 60 percent, from about 15 to about 50 percent and from about 15 to about 40 percent, by weight, respectively. The foregoing has dealt with brick adapted for use where contact is made with steel-making slags. For such use, the replacement of some of the fine magnesia with fine chrome ore has been found to be objectionable. However, such replacement may be acceptable in brick used in other applications.

Improvements in physical properties of such brick, particularly in increased hot-strength and high-temperature load resistance, and decreased porosity and high-temperature shrinkage, have been sought.

It is the principal object of the present invention to provide an improved unburned, basic refractory brick from magnesia and chrome ore.

It is another object of the present invention to provide an unburned magnesia-chrome brick having improved hot-strength and high-temperature load resistance.

It is a further object of the present invention to provide an unburned, magnesia-chrome brick having decreased porosity and increased volume stability on reheating.

Other objects, including the provision of a method for making the improved brick of the invention, will become apparent from the following specification and claims.

SUMMARY OF THE INVENTION

The novel brick of the present invention comprises, in an unburned, basic, refractory brick composed of from about 30 to about 60 percent of relatively coarse magnesia particles, from about 15 to about 50 percent of relatively coarse chrome-ore particles and from about 15 to about 40 percent of relatively fine particles, the improvement wherein said relatively fine particles consist essentially of aggregates, finer than 48 mesh, of a prereacted mixture of periclase particles sintered directly to chrome-ore particles.

It has been found that the replacement of at least the preponderant portion of the relatively fine magnesia and/or chrome ore in an unburned basic magnesia-chrome refractory brick with the stated fine prereacted periclase-chrome ore aggregates markedly improves certain physical properties of the brick. Thus, the hot-strength and high-temperature load resistance are increased, and the porosity and volume stability at high temperatures encountered in use are improved.

BRIEF DESCRIPTION OF THE DRAWING

The drawing illustrates, enlarged and in section, prereacted (cosintered) grains of chrome ore and periclase from which are derived the fine aggregates employed in the present invention.

THE PREFERRED EMBODIMENTS

With respect to the relatively coarse magnesia employed as part of the basic brick batch mix, it may be any dead-burned magnesia used in the manufacture of refractories. It will generally have an MgO content of at least about 88 percent, and, while highly pure magnesia (say, up to 98 percent MgO) may be used, economy and certain other advantages may dictate the use of a magnesia containing no more than about 92 percent MgO. The remainder, of course, is made up of the usual impurities, principally $SiO_2$, CaO, $Fe_2O_3$ and $Al_2O_3$. The relatively coarse magnesia will generally have a particle size of $-2 \frac{1}{2} + 48$ mesh (Tyler), that is to say, substantially all thereof will pass through a 2 ½-mesh screen and be retained on a 48-mesh screen. Preferably, the relatively coarse magnesia will have a particle size of $-4+28$ mesh.

The relatively coarse chrome ore employed will also generally have a particle size of $-2 \frac{1}{2}+48$ mesh, and preferably a particle size of $-4+28$ mesh.

The third principal component of the brick of the present invention are the fine (essentially $-48$ mesh) aggregates of periclase sintered directly to chrome-ore particles. These are derived from a ground prereacted (cosintered) mixture of relatively fine magnesia and relatively coarse chrome ore.

In preparing the cosintered mixture, magnesia, or a source of magnesia like magnesite, magnesium hydroxide, or the like, and chrome ore are mixed and, preferably, the mixture is pressed into shaped bodies, like briquettes. The mixture is then burned or fired to cause sintering and reaction without appreciable melting. For this sintering, a temperature of at least 1,700° C., and preferably at least 1,750° C., is used. During heating to sintering, the magnesia or source of magnesia forms periclase, as cubic crystals, and during sintering a direct ceramic bond is formed by interfacial diffusion between the periclase particles and the chrome-ore particles. This bond is of a nature such that it is retained substantially during subsequent processing. Also during sintering, silicates from the periclase and chrome-ore particles migrate to and accumulate in the small interstices between the particles and there is substantially no silicate layer formed between the periclase particles and chrome-ore particles. Some MgO diffuses from the periclase particles into the chrome-ore particles, and some iron, chromium and aluminum diffuses from the chrome-ore particles into the periclase particles and into the silicate accumulations, where, upon cooling, some of these exsolve as $MgO \cdot Fe_2O_3$, $MgO \cdot Cr_2O_3$ and $MgO \cdot Al_2O_3$. It is believed that, at the high temperatures encountered in ultimate use of the brick, more of these spinels exsolve as $MgO \cdot Fe_2O_3$, $MgO \cdot Cr_2O_3$ and $MgO \cdot H_2O_3$ promoting bond formation.

The foregoing is illustrated in the drawing which is a greatly enlarged sectional view of a portion of the sinter. Numeral 1 represents chrome-ore particles, 2 represents periclase particles, 3 represents the partial exsolutions within the periclase particles and 4 represents the accumulations, in the interstices, of silicates containing the dissolved spinels.

The sinter is then crushed and ground, preferably by ball milling. And the fine material is recovered and employed in accordance with the present invention. Preferably the grinding is such that from about 35 to about 80 percent, and especially from about 40 to about 70 percent, by weight, of the fine material is $-325$ mesh. In any event, substantially all of this fine material will be finer than 48 mesh.

The sources of magnesia in preparing the sintered material include crude (raw) natural magnesite, crude flotation magnesite, magnesium hydroxide, caustic magnesia, calcined magnesite, and the like. The raw natural magnesite generally has an MgO content of at least about 83 percent, such as from about 83 to about 89 percent, and the flotation magnesite has a somewhat higher MgO content up to 92 percent, such as 91–92 percent (based on an oxide analysis of dead-burned material). However, the magnesia employed can even contain a higher proportion of MgO. The preferred magnesia has an MgO content between about 88 and about 92 percent. Raw magnesite is, of course, in carbonate form. Lightly calcined magnesite or magnesium hydroxide, or dead-burned magnesite, having the stated MgO content, may also be subjected to the sintering operation, although this practice is uneconomical as two firing operations are required. Regardless of the chemical form of the source of magnesia used as starting material, it is periclase which cosinters with the chrome ore, and hence reference is made herein simply to a cosintered or prereacted mixture of periclase and chrome ore. The periclase in the cosintering will be finer than 48 mesh and preferably finer than 100 mesh with at least 10 percent thereof −325 mesh.

In the production of the cosintered material, the chrome ore will generally be −4 mesh, and it is desirable that at least 65 percent, and preferably at least 80 percent, of the chrome ore have a particle size over 100 mesh.

The composition of the materials to be used for the cosintering is selected so that the sintered material has a silica content not exceeding 5.5 percent, preferably not exceeding 4.5 percent, and a lime : silica molecular ratio not exceeding 2 : 1, preferably not exceeding 1:1. The aforementioned maximum silica content of 5.5 percent in the sintered material prevents the chrome-ore particles from being enveloped with silicates so that, at the burning temperature used of at least 1,700° C., the obtaining of a direct bond between the chrome-ore particles and the periclase particles is insured.

The sintered material should be prepared from chrome ore having a silica content no higher than 7 percent, preferably less than 5 percent, and the magnesia source should have a lime content such that the sintered material has a lime content from 0.5 to 2.5 percent, preferably from 0.8 to 1.5 percent. Both the chrome ore and the magnesia source should be used in such proportions that the sintered material contains 5 to 30 percent of $Cr_2O_3$.

In preparing the brick according to the present invention the three components, in the stated proportions, are mixed and tempered with a liquid binder to a pressable consistency. The binder is conventional and may be sulfuric acid, chromic acid, magnesium sulfate or chloride, sodium ligninsulfonate, and the like. The moist mixture is then pressed into the desired brick form and dried at a temperature of at least 212° and up to about 300° F. A preferred drying temperature is from about 225° to about 235° F.

As stated, in the brick made according to the present invention, the fine particles consist essentially of the defined prereacted aggregates. It will be understood in this connection that in some cases a minor proportion — even up to 25 percent — of the fine particles may be fine magnesia and/or chrome ore without detracting deleteriously from the advantages realized through the use of the prereacted aggregates in accordance with the present invention.

The present invention will be more readily understood from a consideration of the following specific examples which are given for the purpose of illustration and are not to be considered as limiting the scope of the invention in any way.

EXAMPLES 1–2

In these examples: the calcined magnesite employed analyzes 94.3% MgO, 3.5% $SiO_2$, 0.1% $Fe_2O_3$, 0.1% $Al_2O_3$ and 1.8% CaO (loss on ignition is 0.2% and the chrome-ore analyzes 31.5% $Cr_2O_3$, 5.5% $SiO_2$, 15.5% $Fe_2O_3$, 31.0% $Al_2O_3$, 0.5% CaO and 16.0% MgO. The cosintered fines are prepared by sintering, at 1,800°–1,900° C. briquettes of a mixture of (A) magnesite analyzing (on a calcined basis) 90.9% MgO, 2.9% $SiO_2$, 3.9% $Fe_2O_3$, 0.8% $Al_2O_3$ and 1.5% CaO, and having a particle size of −48 mesh with 25% −325 mesh; and (B) chrome-ore analyzing (on a dried basis) 51.0% $Cr_2O_3$, 3.6% $SiO_2$, 15.4% $Fe_2O_3$, 11.4% $Al_2O_3$, 0.4% CaO and 16.4% MgO and having a particle size of 50% −4 +8 mesh and 50% −8 +48 mesh. The sinter has the composition: 3.1% $SiO_2$, 9.0% $Fe_2O_3$, 6.1% $Al_2O_3$, 1.0% CaO, 56.0% MgO and 24.8% $Cr_2O_3$, and has a bulk specific gravity of 3.43 g./cc. The sinter is then crushed and ballmilled, and the −48-mesh fraction is recovered.

Each mix is pressed into bricks at 15,000 p.s.i. and dried at 230° F.

The formula for each mix and the properties of the resulting brick are set forth in the following table.

|  | 1 | 2[d] |
|---|---|---|
| Calcined magnesite −4 +8 mesh (%) | 15.0 | 8.0 |
| Calcined magnesite −8 +28 mesh (%) | 27.0 | 17.0 |
| Chrome ore −4 +8 mesh (%) | 13.0 | 22.0 |
| Chrome ore −8 +28 mesh (%) | 10.0 | 18.0 |
| Calcined magnesite −48 mesh (%) |  | 35.0 |
| Cosintered fines −48 mesh 60% −325 mesh (%) | 35.0 |  |
| $H_2SO_4$ 25° B. (% added) | 0.55 | 0.55 |
| Lignin Binder* (% added) | 1.5 | 1.5 |
| Brick |  |  |
| Physical properties |  |  |
| Bulk density (g./cc.) | 3.11[a] | 3.05 |
| Porosity after 2,000° F. reheat (%) | 16.6[b] | 18.5 |
| Hot modulus of rupture (p.s.i.) |  |  |
| at 2,300° F. | 415[b] | 200 |
| at 2,700° F. | 127[c] | 50 |
| ASTM load, temp. to failure (° F.) | 3,100+[c] | 2,912 |
| Volume shrinkage, 3,000° F. reheat (%) | 1.1[b] | 4.7 |
| Typical chemical analysis-calculated |  |  |
| (calcined basis) |  |  |
| $SiO_2$ | 3.6 | 4.3 |
| CaO | 1.0 | 0.9 |
| $Fe_2O_3$ | 6.8 | 6.0 |
| $Al_2O_3$ | 9.4 | 12.5 |
| MgO | 63.2 | 62.5 |
| $Cr_2O_3$ | 15.9 | 13.0 |

* 50% aqueous solution of sodium ligninsulfonate.
[a] An average of 20 specimens.
[b] An average of 3 specimens.
[c] An average of 2 specimens.
[d] The physical property data in this column is typical and derived from many specimens.

Modification is possible in the selection of materials and proportions thereof without departing from the scope of the present invention.

What is claimed is:

1. In the method for the preparation of basic, unburned refractory brick wherein a tempered mixture of from about 30 to about 60 percent of coarse magnesia particles, from about 15 to about 50 percent of coarse chrome-ore particles, and from about 15 to about 40 percent of fine particles is pressed into brick form and dried, the improvement wherein said fine particles consist essentially of prereacted aggregates, finer than 48 mesh, of fine periclase particles sintered directly to relatively coarse chrome-ore particles.

2. The method of claim 1 wherein said prereacted aggregates consist essentially of the −48-mesh fraction of a ground cosintered mixture of −48-mesh periclase and −4-mesh chrome ore.

3. The method of claim 1 wherein from about 35 to about 80 percent of said prereacted aggregates are −325 mesh.

4. The method of claim 2 wherein said fine particles consist essentially of the −48-mesh fraction of a ground cosintered mixture of −100-mesh periclase and −4-mesh chrome ore, and wherein from about 35 to about 80 percent of said prereacted aggregates are −325 mesh.

5. The method of claim 4 wherein from about 40 to about 70 percent of said prereacted aggregates are −325 mesh.

6. The method of claim 2 wherein the relative proportions of said periclase and chrome ore in said cosintered mixture provide a $Cr_2O_3$ content in said mixture of from about 5 to about 30 percent, and wherein said cosintered mixture has a silica content no greater than 5.5 percent.

7. In a basic, unburned, refractory brick consisting essentially of from about 30 to about 60 percent of coarse magnesia particles, from about 15 to about 50 percent of coarse chrome-ore particles, and from about 15 to about 40 percent of fine particles, the improvement wherein said fine particles consist essentially of prereacted aggregates finer than 48 mesh, of fine periclase particles sintered directly to relatively coarse chrome-ore particles.

8. The brick of claim 7 wherein said fine particles consist essentially of the −48-mesh fraction of a ground, cosintered mixture of −48-mesh periclase and −4-mesh chrome ore.

9. The brick of claim 7 wherein from about 35 to about 80 percent of said prereacted aggregates are −325 mesh.

10. The brick of claim 8 wherein said fine particles consist essentially of the −48-mesh fraction of a ground cosintered mixture of −100-mesh periclase and −4-mesh chrome ore, and wherein from about 35 to about 80 percent of said prereacted aggregates are −325 mesh.

11. The brick of claim 10 wherein from about 40 to about 70 percent of said prereacted aggregates are −325 mesh.

12. The brick of claim 8 wherein the relative proportions of said periclase and said chromite in said cosintered mixture provide a $Cr_2O_3$ content of from about 5 to about 30 percent, and wherein said cosintered mixture has a silica content no greater than 5.5 percent.

* * * * *